US009056961B2

(12) United States Patent
Steinke et al.

(10) Patent No.: US 9,056,961 B2
(45) Date of Patent: Jun. 16, 2015

(54) MELAMINE-RESIN FOAMS COMPRISING HOLLOW MICROBEADS

(75) Inventors: Tobias Heinz Steinke, Speyer (DE); Armin Alteheld, Bad Kreuznach (DE); Tatiana Ulanova, Ludwigshafen (DE); Meik Ranft, Bensheim (DE); Maxim Peretolchin, Mannheim (DE); Horst Baumgartl, Mainz (DE); Hans-Jürgen Quadbeck-Seeger, Bad Dürkheim (DE); Klaus Hahn, Kirchheim (DE)

(73) Assignee: BASF SE, Ludwigshafen (DE)

( * ) Notice: Subject to any disclaimer, the term of this patent is extended or adjusted under 35 U.S.C. 154(b) by 311 days.

(21) Appl. No.: 13/510,487

(22) PCT Filed: Nov. 16, 2010

(86) PCT No.: PCT/EP2010/067556
§ 371 (c)(1),
(2), (4) Date: May 17, 2012

(87) PCT Pub. No.: WO2011/061178
PCT Pub. Date: May 26, 2011

(65) Prior Publication Data
US 2012/0225965 A1 Sep. 6, 2012

(30) Foreign Application Priority Data

Nov. 20, 2009 (EP) .................... 09176634

(51) Int. Cl.
C08J 9/00 (2006.01)
C08J 9/42 (2006.01)
C08J 9/32 (2006.01)
C08J 9/40 (2006.01)

(52) U.S. Cl.
CPC .... C08J 9/42 (2013.01); C08J 9/32 (2013.01); C08J 9/40 (2013.01); C08J 2205/05 (2013.01); C08J 2361/06 (2013.01); C08J 2361/24 (2013.01); C08J 2361/28 (2013.01)

(58) Field of Classification Search
CPC ................. C08J 9/32; C08J 9/40; C08J 9/42; C08J 2205/05; C08J 2361/06; C08J 2361/24; C08J 2361/28
USPC ........................... 521/55, 137, 187
See application file for complete search history.

(56) References Cited

U.S. PATENT DOCUMENTS

| 3,615,972 | A | 10/1971 | Morehouse, Jr. et al. |
| 3,878,133 | A | 4/1975 | Ruebens |
| 4,334,971 | A | 6/1982 | Mahnke et al. |
| 4,454,248 | A * | 6/1984 | Pollock et al. ........ 521/53 |
| 4,511,678 | A | 4/1985 | Mahnke et al. |
| 4,540,717 | A | 9/1985 | Mahnke et al. |
| 5,098,496 | A | 3/1992 | Breitigam et al. |
| 5,272,001 | A | 12/1993 | Weisman |
| 5,294,461 | A | 3/1994 | Ishida |
| 5,378,733 | A | 1/1995 | Bates et al. |
| 5,418,257 | A | 5/1995 | Weisman |
| 5,424,388 | A | 6/1995 | Chen et al. |
| 6,022,912 | A | 2/2000 | Spitler et al. |
| 6,166,109 | A | 12/2000 | Spitler et al. |
| 6,517,654 | B1 | 2/2003 | Heckel et al. |
| 7,166,355 | B2 | 1/2007 | Jahns et al. |
| 7,898,022 | B2 | 3/2011 | Bhattacharyya |
| 8,051,767 | B2 | 11/2011 | Gerber |
| 8,066,160 | B2 | 11/2011 | Sakane et al. |
| 2005/0136238 | A1 | 6/2005 | Lindsay et al. |
| 2006/0052474 | A1 | 3/2006 | Czerny |
| 2007/0157405 | A1 | 7/2007 | Bogaerts et al. |
| 2007/0157948 | A1 * | 7/2007 | Gonzales et al. ........ 134/6 |
| 2008/0033075 | A1 | 2/2008 | Schmidt et al. |

(Continued)

FOREIGN PATENT DOCUMENTS

CA 1151350 A1 8/1983
CA 1166798 A1 5/1984

(Continued)

OTHER PUBLICATIONS

International Search Report for PCT/EP2010/067556 mailed Feb. 8, 2011.
International Preliminary Report on Patentability for PCT/EP2010/067556 mailed Jan. 16, 2012.
International Preliminary Report on Patentability from corresponding International Application No. PCT/EP2010/067556 dated Jun. 25, 2012.

(Continued)

*Primary Examiner* — Irina S Zemel
(74) *Attorney, Agent, or Firm* — Drinker Biddle & Reath LLP

(57) ABSTRACT

The invention relates to foam comprising hollow microbeads and intended for sound absorption, comprising from 40 to 85% by weight of open-cell polymer foam and from 15 to 60% by weight of hollow microbeads with flexible external layer, where the $D_{50}$ value of the hollow microbeads is at least 70 μm and at most 250 μm, based on the total weight of polymer foam and hollow microbeads, and also to a process for producing the same, comprising the following steps:

I) impregnation of an open-cell polymer foam with a liquid dispersion comprising expandable hollow microbeads, II) if appropriate, pressing/compression and/or drying of the polymer foam, and III) heat-treatment of the impregnated polymer foam at a temperature above the expansion temperature and below the decomposition temperature of the expandable hollow microbeads, for the expansion of the hollow microbeads.

12 Claims, No Drawings

(56) References Cited

U.S. PATENT DOCUMENTS

| | | |
|---|---|---|
| 2008/0280126 A1 | 11/2008 | Lenz et al. |
| 2008/0300329 A1 | 12/2008 | Fechtenkotter et al. |
| 2010/0028655 A1 | 2/2010 | Lenz et al. |
| 2010/0068525 A1 | 3/2010 | Jung et al. |
| 2010/0089258 A1 | 4/2010 | Bosga |
| 2010/0184898 A1 | 7/2010 | Weber et al. |
| 2010/0190897 A1 | 7/2010 | Maletzko et al. |
| 2010/0197859 A1 | 8/2010 | Weber et al. |
| 2010/0286303 A1 | 11/2010 | Weber et al. |
| 2010/0310833 A1 | 12/2010 | Scherzer et al. |
| 2010/0323892 A1 | 12/2010 | Levy et al. |
| 2010/0327216 A1 | 12/2010 | Jung et al. |
| 2011/0008608 A1 | 1/2011 | Bellin et al. |
| 2011/0009566 A1 | 1/2011 | Jain et al. |
| 2011/0009877 A1 | 1/2011 | Thenuwara et al. |
| 2011/0015072 A1 | 1/2011 | Hechavarria Fonseca et al. |
| 2011/0017205 A1 | 1/2011 | Wachtel et al. |
| 2011/0029106 A1 | 2/2011 | Isberg et al. |
| 2011/0034571 A1 | 2/2011 | Hahn et al. |
| 2011/0049411 A1 | 3/2011 | Ulanova et al. |
| 2011/0051197 A1 | 3/2011 | Yao et al. |
| 2011/0059109 A1 | 3/2011 | Smith et al. |
| 2011/0092645 A1 | 4/2011 | Loth et al. |
| 2011/0098372 A1 | 4/2011 | Aulenta et al. |
| 2011/0155309 A1 | 6/2011 | Steininger et al. |
| 2011/0189464 A1 | 8/2011 | Steinke et al. |
| 2011/0196098 A1 | 8/2011 | Mettlach et al. |
| 2011/0201728 A1 | 8/2011 | Yamamoto et al. |
| 2011/0201747 A1 | 8/2011 | Weber et al. |
| 2011/0218294 A1 | 9/2011 | Weber et al. |
| 2011/0224386 A1 | 9/2011 | Weber et al. |
| 2011/0237693 A1 | 9/2011 | Weber et al. |
| 2011/0237694 A1 | 9/2011 | Weber et al. |
| 2011/0237699 A1 | 9/2011 | Steinke et al. |
| 2011/0244743 A1 | 10/2011 | Scherzer et al. |
| 2011/0251337 A1 | 10/2011 | Weber et al. |
| 2011/0269864 A1 | 11/2011 | Steinke et al. |
| 2011/0270807 A1 | 11/2011 | Gomez Maturana et al. |
| 2011/0288258 A1 | 11/2011 | Desbois et al. |
| 2011/0294912 A1 | 12/2011 | Weber et al. |
| 2011/0306718 A1 | 12/2011 | Scherzer et al. |
| 2011/0319550 A1 | 12/2011 | Weber et al. |
| 2012/0071578 A1 | 3/2012 | Baumgartl et al. |
| 2012/0076843 A1 | 3/2012 | Jung et al. |
| 2012/0088048 A1 | 4/2012 | Scherzer et al. |
| 2012/0108693 A1 | 5/2012 | Gibon et al. |
| 2012/0112116 A1 | 5/2012 | Steinke et al. |
| 2012/0112122 A1 | 5/2012 | Jung et al. |
| 2012/0142802 A1 | 6/2012 | Steinke et al. |
| 2012/0213998 A1 | 8/2012 | Weber et al. |
| 2012/0225965 A1 | 9/2012 | Steinke et al. |
| 2012/0245308 A1 | 9/2012 | El-Toufaili et al. |
| 2012/0252962 A1 | 10/2012 | Weber et al. |
| 2012/0296031 A1 | 11/2012 | Weber et al. |

FOREIGN PATENT DOCUMENTS

| | | |
|---|---|---|
| DE | 2401565 | 7/1975 |
| DE | 2401565 A1 | 7/1975 |
| DE | 10027770 A1 | 12/2001 |
| DE | 10139171 A1 | 2/2003 |
| DE | 102007055813 A1 | 6/2008 |
| DE | 102007031467 A1 | 1/2009 |
| EP | 17 671 A1 | 10/1980 |
| EP | 17 672 A1 | 10/1980 |
| EP | 0031513 A2 | 7/1981 |
| EP | 0037470 A1 | 10/1981 |
| EP | 0041934 * | 12/1981 |
| EP | 0049768 A1 | 4/1982 |
| EP | 56 703 A1 | 7/1982 |
| EP | 0384063 A2 | 8/1990 |
| EP | 0 451 535 A1 | 10/1991 |
| EP | 579 047 A1 | 1/1994 |
| EP | 0752306 A1 | 1/1997 |
| EP | 1029018 A1 | 8/2000 |
| EP | 2287241 A1 | 2/2011 |
| GB | 1206993 * | 9/1970 |
| GB | 1451132 A | 9/1976 |
| JP | 2004323603 A | 11/2004 |
| JP | 2007302902 A | 11/2007 |
| WO | WO-98/52997 A1 | 11/1998 |
| WO | WO-2004022298 A1 | 3/2004 |
| WO | WO-2005/116559 A1 | 12/2005 |
| WO | WO-2006/008054 | 1/2006 |
| WO | WO-2007023118 A2 | 3/2007 |
| WO | WO-2008037600 A1 | 4/2008 |
| WO | WO-2008/716649 | 6/2008 |
| WO | WO-2009/003901 A1 | 1/2009 |
| WO | WO-2009034114 A1 | 3/2009 |
| WO | WO-2010/089241 A1 | 8/2010 |
| WO | WO-2010/145993 A2 | 12/2010 |
| WO | WO-2011/000816 A1 | 1/2011 |
| WO | WO-2011/004006 A2 | 1/2011 |
| WO | WO-2011/009798 A1 | 1/2011 |
| WO | WO-2011/051170 A1 | 5/2011 |
| WO | WO-2011/051273 A2 | 5/2011 |
| WO | PCT/EP2010/069644 | 6/2011 |
| WO | WO-2011/073196 A1 | 6/2011 |
| WO | WO-2011/073197 A1 | 6/2011 |
| WO | WO-2011069892 A1 | 6/2011 |
| WO | WO-2011/117344 A1 | 9/2011 |

OTHER PUBLICATIONS

English Translation of Japanese Office Action for Application No. 2012-539299, dated Dec. 9, 2013.

U.S. Appl. No. 13/016,420.

U.S. Appl. No. 13/382,782.

U.S. Appl. No. 13/504,717.

U.S. Appl. No. 61/316,848.

U.S. Appl. No. 13/267,628.

U.S. Appl. No. 13/376,665.

U.S. Appl. No. 13/376,901.

U.S. Appl. No. 13/377,979.

U.S. Appl. No. 13/391,082.

U.S. Appl. No. 13/378,980, Schmidt et al.

Lulser, et al., "Reaction injection pultrusion of PA12 composites: process and modeling", composites: Part A, (2003), p. 583-595.

* cited by examiner

MELAMINE-RESIN FOAMS COMPRISING HOLLOW MICROBEADS

CROSS-REFERENCE TO RELATED APPLICATIONS

This application is a national stage application (under 35 U.S.C. §371) of PCT/EP2010/067556, filed Nov. 16, 2010, which claims benefit of European Application 09176634.5, filed Nov. 20, 2009.

The present invention relates to an open-cell foam comprising hollow microbeads with a flexible external layer, for sound absorption, where the $D_{50}$ value of the hollow microbeads is at least 70 μm and at most 250 μm, and to a process for producing the same, and to its use for sound absorption and/or thermal insulation.

Modern society places stringent requirements on materials for sound absorption and sound-deadening. Sound-absorbent and sound-deadening materials are used to improve stereophonic effect, for example to reduce the extent of undesired reverberations. Plastics are often used for this purpose, these being suitable materials because they have excellent viscoelasticity, are easy to process, and are available commercially. The form in which these plastics are used is often that of porous foams.

A feature of porous materials is that they exhibit good sound absorption at high frequencies, but have low absorption capability at lower frequencies. The sound absorption of plastics foams at lower frequencies can by way of example be improved by using thin films and layers (vibration) or by using resonators. However, these measures have limited effect, because the frequency ranges are restricted, and also because of structural limitations, such as width and weight.

Another possibility for improving the sound-deadening and sound-absorbing properties of plastics consists in introducing various fillers into the plastics.

U.S. Pat. No. 5,378,733 describes polyurethane compositions for attenuating sound, which comprise a two-component polyurethane binder, a particulate filler with density above 5, and, as second filler, hollow polymer microbeads of density below 0.5. The hollow microbeads are introduced via dispersion in the polyol component prior to reaction of the components to give polyurethane.

WO 2004/022298 A1 relates to an acoustically insulating material which is produced via extrusion of thermoplastic rubber particles and PU plastics particles, with addition of expandable hollow bodies as blowing agent.

WO 98/52997 A1 discloses a foam made of a mixture of epoxy resin and thermoplastic. Blowing agents that can be used are inter alia thermally expandable hollow microbeads. The foams described in WO 98/52997 can be used inter alia as sound-deadening elements in automobiles.

U.S. Pat. No. 5,272,001 relates to open-cell, flexible polyurethane foams which, in order to improve elasticity and shock-absorbent properties, comprise hollow microbeads with an average diameter of from 35 to 60 μm.

Despite the modified foams disclosed hitherto, there is a need for foams with improved sound-absorbent and sound-deadening properties in the relatively low-frequency range.

The invention achieves this object via a
foam comprising hollow microbeads and intended for sound absorption, comprising
from 40 to 85% by weight of open-cell polymer foam and
from 15 to 60% by weight of hollow microbeads with flexible external layer, where the $D_{50}$ value of the hollow microbeads is at least 70 μm and at most 250 μm,
based on the total weight of polymer foam and hollow microbeads.

In the frequency range from about 300 to 1600 Hz, the foam of the invention has higher sound-absorption coefficients than the same foam comprising no, or lower, content of hollow microbeads. Surprisingly, the effect of the hollow microbeads comprised in the foam depends on their size. The hollow microbeads have to have a minimum size in order to bring about an advantageous effect, i.e. the desired improvement in sound-absorption properties. Hollow microbeads having a $D_{50}$ value from about 35 to 55 μm have no effect on the sound absorption of the foam, but in contrast if the foams comprise larger hollow microbeads having a $D_{50}$ value 70 μm, they exhibit higher sound absorption coefficients and higher flow resistances, likewise correlated with improved sound deadening. Surprisingly, the presence of the hollow microbeads has no, or only very slight, adverse effect on the mechanical properties of the foams of the invention, although comparatively large hollow microbeads have to be used.

The invention is explained in detail below.

The foam of the invention comprises from 40 to 85% by weight, preferably from 50 to 80% by weight, of open-cell polymer foam, based on the total weight of open-cell polymer foam and hollow microbeads.

Open-cell foams are those in which the foam structure consists essentially of a large number of interconnected, three-dimensionally branched cell walls. The smaller the areas of the open-cell polymer foam sealed by polymer membranes, the more elastic the foam.

It is preferable to use open-cell polymer foams of the invention which comprise a large number of interconnected, three-dimensionally branched cell walls, where the average length:thickness ratio of the walls is greater than 10:1, preferably greater than 12:1, and in particular greater than 15:1, and where the density of the walls is greater than 1.1 g/cm$^3$, preferably greater than 1.2 g/cm$^3$, and in particular greater than 1.3 g/cm$^3$.

The average length:thickness ratio is determined microscopically, and the length and thickness of the wall here are determined by a statistical evaluation method. The length of the wall here is defined as the distance between the centers of two junctions, and the thickness of the wall here is defined as the thickness at the narrowest point of the wall, in each case measured on the micrograph. To determine the density of the walls in the foam, the foam is placed in a suitable liquid with which it becomes completely saturated by virtue of its open-cell nature, an example being isopropanol. Archimedes' principle is then used to determine the density of the cell walls.

In the invention, it is preferable that the open-cell polymer foam is elastic.

Elastic foams have high resilience after deformation. The foams termed elastic foams are in particular those which, when subjected to compressive deformation to DIN 53580 extending to 50% of their thickness, exhibit no residual deformation of more than 2% of their initial volume (Römpp Chemie-Lexikon [Römpp's Chemical Encyclopedia], 9th edition 1995, page 4016).

In principle, the polymer foam can be produced from any of the polymers known to the person skilled in the art to be suitable for producing open-cell polymer foams. It is preferable that the polymer foam is selected from thermoset foams, particularly preferably from the group consisting of phenol-formaldehyde-resin foam, urea-formaldehyde-resin foam, and melamine-formaldehyde-resin foam, and particular preference is given here to melamine-formaldehyde-resin foam.

The production of suitable melamine-formaldehyde-resin foams has been described by way of example in EP 0 017 671

B1, and suitable urea-formaldehyde-resin foams are known by way of example from EP 0 031 513 B1. The production of thermoset foams such as phenol-formaldehyde-resin foams which can be used in the invention has been described by way of example in EP 0 049 768 B1.

It is very particularly preferable in the invention to use melamine-formaldehyde-resin foams such as those described by way of example in EP 0 017 672 B1 and available commercially with trademark Basotect®.

The envelope density of the open-cell foam is generally in the range from 5 to 100 g/l, preferably in the range from 8 to 20 g/l. Tensile strength is preferably in the range from 100 to 150 kPa, with tensile strength at break in the range from 8 to 20%.

The foam of the invention comprises from 15 to 60% by weight, preferably from 20 to 50% by weight, of hollow microbeads with a flexible external layer, where the $D_{50}$ value of the hollow microbeads is at least 70 μm and at most 250 μm.

The hollow microbeads have a flexible external layer, and this means that the hollow microbeads are readily compressible, and they have sufficient elasticity to withstand a plurality of load cycles or pressure cycles without rupture of their shell. It is preferable to use hollow micorbeads which have an external layer formed from one or more homopolymers and/or from one or more copolymers, where the glass transition temperature of these is below the service temperature of the foam. It is particularly preferable that the external layer of the hollow microbeads is formed from one or more thermoplastic homopolymers and/or copolymers.

It is very preferable that the hollow microbeads comprised in the foam of the invention are expanded hollow microbeads that have been obtained via expansion of expandable hollow microbeads. Hollow microbeads of this type consist essentially of a gas-tight, polymeric external layer and of a liquid or gaseous blowing agent enclosed therein. The external layer of the expandable and, respectively, expanded hollow micorbeads usually behaves like a thermoplastic, in order to permit softening and expansion of the expandable hollow microbeads when the blowing agent expands as a result of heating. The homopolymers and/or copolymers used in the external layer can be linear, branched, or crosslinked polymers. The external layer often uses polymers and copolymers which comprise acrylic acid, methacrylic acid, styrene, vinylidene chloride, acrylonitrile, methacrylonitrile, and the like, or else a mixture thereof. The blowing agents used usually comprise lower hydrocarbons, such as propane, n-butane, isobutane, isopentane, n-pentane, neopentane, hexane, heptane, and petroleum ether, and halogenated hydrocarbons, such as methyl chloride, methylene chloride, trichlorofluoromethane, and dichlorodifluoromethane. The expandable hollow microbeads can be produced by known processes, such as those described in U.S. Pat. No. 3,615,972. The average diameter of the expandable hollow microbeads usually increases by a factor of from 4 to 6 on expansion.

Suitable hollow microbeads in expandable and expanded form are also available commercially, for example with trademark "EXPANCEL®" from Akzo Nobel.

In the invention, the $D_{50}$ value of the hollow microbeads comprised in the foam is at least 70 μm, preferably at least 90 μm, and very particularly preferably at least 100 μm. The $D_{50}$ value states the particle diameter for which the diameter of 50% of the particles is smaller and that of 50% of the particles is greater. The $D_{50}$ value can, for example, be determined by means of light scattering. An example of a method for determining the $D_{50}$ value is described in Technical Bulletins No. 3B from Akzo Nobel.

In the invention, it is preferable that the $D_{50}$ value of the hollow microbeads comprised in the foam is at most 250 μm. The hollow microbeads are intended to fill the volume of the foam pores, but not to block the pores and channels of the foam.

In the invention, it is preferable that the location of the hollow microbeads is within the pores of the open-cell polymer foam.

The present invention further provides a process for producing a foam comprising hollow microbeads, in particular for producing the foam comprising hollow microbeads described above, comprising the following steps:

I) impregnation of an open-cell polymer foam with a liquid dispersion comprising expandable hollow microbeads,
II) if appropriate, pressing/compression and/or drying of the polymer foam, and
III) heat-treatment of the impregnated polymer foam at a temperature above the expansion temperature and below the decomposition temperature of the expandable hollow microbeads, for the expansion of the hollow microbeads.

In step I), an open-cell polymer foam is impregnated with a liquid dispersion comprising expandable hollow microbeads. The impregnation can take place via spray-application, or immersion and saturation with the dispersion comprising the expandable hollow microbeads, for example by the incipient-wetness method, in which the porous volume of the polymer foam is filled by an approximately identical volume of impregnation solution and the carrier is dried. It is also possible to operate with an excess of solution, where the volume of said solution is greater than the porous volume of the polymer foam. Here, the polymer foam is mixed with the impregnation solution and agitated for a sufficient time.

The mixture used for the impregnation process comprises from 0.01 to 50% by weight, preferably from 1 to 10% by weight, of expandable hollow microbeads, and from 50 to 99.99% by weight, preferably from 90 to 99% by weight, of liquid dispersion medium, based on the total weight of the liquid dispersion. The concentration and amount of the mixture used for the impregnation process is adjusted by the person skilled in the art to be appropriate for the polymer foam to be impregnated and for the desired constitution of the foam comprising hollow microbeads. By way of example, impregnation mixtures with low concentration of hollow microbeads are used for polymer foams of low density.

The $D_{50}$ value of the expandable hollow microbeads used for the impregnation process if preferably >16 μm, with preference >20 μm, and with particular preference >25 μm. In order to ensure homogeneous incorporation of the hollow microbeads into the pore space without blocking of the pores and channels, it is preferable to use hollow microbeads having $D_{50}$ value ≤100 μm and particularly preferably ≤50 μm, in each case based on the size prior to the expansion process.

The dispersion medium used preferably comprises water and/or $C_1$-$C_4$ alcohols, and this applies particularly to the case where the polymer foam has been selected from polar polymers, and very particularly where the polymer foam has been selected from melamine-formaldehyde-resin foam, urea-formaldehyde-resin foam, and phenol-formaldehyde-resin foam.

The mixture used for the impregnation process can comprise further constituents, examples being
a) fluorocarbon resins for hydrophobization (see WO 2008/037600)
b) hydrophobizing and flame-retardant substances (see WO 2007/023118).

If appropriate, the impregnated polymer foam is pressed or compressed and dried in step II), and this preferably takes place at temperatures below the expansion temperature of the expandable hollow microbeads.

The pressing process can by way of example be carried out as described in EP 0 451 535 A, by passing the foam through a defined gap between two contrarotating parallel rolls.

Another possibility, alongside passage of the foam through a gap between two contrarotating rolls, is to exert the necessary pressure by transporting the impregnated foam on a conveyor belt and pressing, onto the foam, a roll which rotates at a peripheral velocity the same as that with which the foam is moved. In another method for exerting the pressure on the foam, the foam is by way of example placed in a press in which a ram presses the foam. However, continuous pressing is not possible in this case.

In step III) of the process of the invention, the impregnated polymer foam is heat-treated at a temperature above the expansion temperature of the expandable hollow microbeads and below the decomposition temperature of the hollow microbeads, so that the hollow microbeads expand. The precise heat-treatment temperature depends on the expandable hollow microbeads used, and also on the heat-treatment time.

An advantage of the production process described above for the foam of the invention comprising hollow microbeads is that it ensures that the structure of the open-cell polymer foam used is retained. The hollow microbeads, which prior to the expansion process are comparatively small, become uniformly distributed in the pores of the polymer foam during the impregnation step, and expand within the pores. Since the invention uses hollow microbeads with a flexible external layer, it is also possible for the hollow microbeads to fill the respective pore completely, after the expansion process, without disruption of the structure of the polymer foam, since the microbeads can adapt themselves to the respective pore.

The present invention also provides the use of the foam described above, comprising hollow microbeads, for sound absorption, for sound deadening, and for thermal insulation, in particular in motor vehicle construction, rail vehicle construction, shipbuilding, and aircraft construction, and in aerospace. The present invention also provides sound-absorption and thermal-insulation elements which comprise the foam described above, examples being wall panels and ceiling panels.

Examples are used below to illustrate the present invention.

EXAMPLES

Example 1 (of the Invention)

A melamine-formaldehyde-resin foam (Basotect® G, density 7.3 g/l, BASF SE) was saturated with aqueous dispersions of expandable hollow microbeads. The hollow microbeads were EXPANCEL® 091DU140, Akzo Nobel. The external layer of the beads is composed of a copolymer of acrylate, vinylidene chloride and acrylonitrile. The hollow microbeads comprise an enclosed blowing agent (isobutane or isopentane).

According to information from the producer, the $D_{50}$ value of the expandable particles was from 35 to 45 μm. The impregnated polymer foam was dried at 100° C. in an oven and then subjected to 130° C. for 1 hour, whereupon the EXPANCEL® hollow microbeads expanded to a size of about 100 to 150 μm.

Example 2 (Comparison)

The procedure was as in Example 1, except that the expandable hollow microbeads used comprised EXPAN-CEL® 820SL40, having $D_{50}$ value of from 10 to 16 μm, and having $D_{50}$ value of about 35 to 55 μm after the expansion process.

Example 3 Measurement of Sound-absorption Coefficients

Sound absorption was determined to ISO 10534-2 for the polymer foams from Examples 1 and 2, impregnated with hollow microbeads. Table 1 gives the results for Example 1 and Table 2 gives the results for Example 2.

TABLE 1

Absorption coefficients of the polymer foams from Example 1 (of the invention)

| Frequency | Absorption coefficient Concentration of hollow microbeads [% by weight] | | | | |
|---|---|---|---|---|---|
| [Hz] | 0 | 5 | 10 | 20 | 30 |
| 100 | 0.05 | 0.056 | 0.049 | 0.047 | 0.061 |
| 125 | 0.062 | 0.073 | 0.071 | 0.066 | 0.058 |
| 160 | 0.097 | 0.104 | 0.104 | 0.101 | 0.08 |
| 200 | 0.112 | 0.122 | 0.126 | 0.116 | 0.115 |
| 250 | 0.133 | 0.147 | 0.164 | 0.133 | 0.157 |
| 315 | 0.155 | 0.173 | 0.217 | 0.17 | 0.24 |
| 400 | 0.199 | 0.204 | 0.285 | 0.264 | 0.393 |
| 500 | 0.306 | 0.296 | 0.343 | 0.421 | 0.573 |
| 630 | 0.452 | 0.467 | 0.37 | 0.608 | 0.765 |
| 800 | 0.6 | 0.627 | 0.581 | 0.764 | 0.901 |
| 1000 | 0.732 | 0.761 | 0.768 | 0.882 | 0.966 |
| 1250 | 0.831 | 0.882 | 0.84 | 0.925 | 0.997 |
| 1600 | 0.909 | 0.961 | 0.948 | 0.981 | 0.965 |
| 2000 | 0.956 | 0.989 | 0.982 | 0.963 | 0.897 |
| 2500 | 0.962 | 0.974 | 0.961 | 0.899 | 0.832 |
| 3150 | 0.933 | 0.935 | 0.913 | 0.852 | 0.792 |
| 4000 | 0.911 | 0.926 | 0.904 | 0.831 | 0.813 |
| 5000 | 0.892 | 0.923 | 0.924 | 0.891 | 0.88 |

TABLE 2

Absorption coefficients for the polymer foams from Example 2 (comparison) loaded with hollow microbeads

| Frequency | Absorption coefficient Concentration of hollow microbeads [% by weight] | | | |
|---|---|---|---|---|
| [Hz] | 0 | 5 | 7 | 25 |
| 100 | 0.104 | 0.099 | 0.097 | 0.089 |
| 125 | 0.104 | 0.098 | 0.103 | 0.099 |
| 160 | 0.132 | 0.119 | 0.125 | 0.122 |
| 200 | 0.158 | 0.137 | 0.134 | 0.136 |
| 250 | 0.19 | 0.165 | 0.154 | 0.16 |
| 315 | 0.222 | 0.206 | 0.175 | 0.203 |
| 400 | 0.28 | 0.279 | 0.217 | 0.276 |
| 500 | 0.41 | 0.359 | 0.317 | 0.357 |
| 630 | 0.6 | 0.435 | 0.46 | 0.438 |
| 800 | 0.766 | 0.467 | 0.596 | 0.479 |
| 1000 | 0.888 | 0.645 | 0.72 | 0.628 |
| 1250 | 0.966 | 0.81 | 0.843 | 0.755 |
| 1600 | 0.991 | 0.915 | 0.936 | 0.89 |
| 2000 | 0.974 | 0.968 | 0.98 | 0.958 |
| 2500 | 0.941 | 0.971 | 0.972 | 0.965 |
| 3150 | 0.927 | 0.943 | 0.944 | 0.943 |
| 4000 | 0.979 | 0.917 | 0.926 | 0.917 |
| 5000 | 0.945 | 0.898 | 0.908 | 0.896 |

With EXPANCEL® 091DU140, a marked improvement in absorption at lower to moderate frequency (from 250-1500 Hz) was achieved at loadings >10%, whereas with EXPANCEL® 820SL40 a deterioration is found in said frequency range when comparison is made with the untreated foam.

Example 4 Measurement of Flow Resistance

Flow resistance to ISO 9053 was determined for the polymer foams from Examples 1 and 2 comprising hollow microbeads. Tables 3 and 4 show the results.

TABLE 3

Flow resistance of foams of Example 1 (of the invention)

| Concentration of hollow microbeads [% by wt.] | Density [g/l] | Flow resistance* [Pa*s/m²] |
|---|---|---|
| 0 | 7.3 | 11850 |
| 10 | 8.1 | 13225 |
| 20 | 8.5 | 17225 |
| 30 | 8.7 | 20425 |

At 30% loading, flow resistance was almost doubled in comparison with the standard.

TABLE 4

Flow resistance of foams of Example 2 (comparison)

| Concentration of hollow microbeads [% by wt.] | Density [g/l] | Flow resistance* [Pa*s/m²] |
|---|---|---|
| 0 | 7.3 | 11700 |
| 5 | 8.3 | 10725 |
| 7 | 8.2 | 11675 |
| 25 | 8.7 | 11925 |

Saturation of Basotect with the smaller Expancel SL40 microbeads did not improve absorption or flow resistance. The size of the beads therefore has a significant effect on acoustic properties.

The invention claimed is:

1. A foam comprising expanded hollow microbeads and intended for sound absorption, comprising
    from 40 to 85% by weight of open-cell polymer foam and
    from 15 to 60% by weight of expanded hollow microbeads with flexible external layer,
    where the $D_{50}$ value of the expanded hollow microbeads is at least 100 micrometers and at most 250 micrometers, based on the total weight of polymer foam and expanded hollow microbeads,
    wherein the polymer foam is selected from the group consisting of phenol-formaldehyde-resin foam, urea-formaldehyde-resin foam, and melamine-formaldehyde-resin foam.

2. The foam according to claim 1, wherein the density of the open-cell polymer foam is from 5 to 100 g/l.

3. The foam according to claim 1, wherein the polymer foam is a melamine-formaldehyde-resin foam.

4. The foam according to claim 2, wherein the polymer foam is a melamine-formaldehyde-resin foam.

5. The foam according to claim 1, wherein the external layer of the expanded hollow microbeads have been foamed from one or more homopolymers and/or copolymers with glass transition temperature below the service temperature of the foam.

6. A process for producing the foam comprising expanded hollow microbeads, according to claim 1, comprising the following steps:
    I) impregnating an open-cell polymer foam with a liquid dispersion comprising expandable hollow microbeads,
    II) optionally pressing/compressing or drying of the polymer foam, and
    III) heat-treating the impregnated polymer foam at a temperature above the expansion temperature and below the decomposition temperature of the expandable hollow microbeads, for the expansion of the hollow microbeads.

7. The process according to claim 6, wherein the $D_{50}$ value of the expandable hollow microbeads used for the impregnation process is >16 micrometers and <100 µm.

8. The process according to claim 7, wherein the $D_{50}$ value is ≤50 µm.

9. The process according to claim 6, wherein the mixture used in step I) for the impregnating process comprises from 0.01 to 50% by weight of expandable hollow microbeads and from 50 to 99.99% by weight of liquid dispersion medium, based on the total weight of the liquid dispersion.

10. The process according to claim 6, wherein step I) uses, as dispersion medium, water or $C_1$-$C_4$ alcohols.

11. A method for sound absorption or thermal insulation which comprises employing the foam comprising expanded hollow microbeads according to claim 1.

12. A sound-absorption or thermal-insulation element comprising the foam comprising expanded hollow microbeads according to claim 1.

* * * * *